United States Patent
Luong et al.

(10) Patent No.: US 7,453,811 B1
(45) Date of Patent: Nov. 18, 2008

(54) APPARATUS AND METHODS FOR UPDATING STALE LINK STATE PACKETS AND ROUTING TABLE ENTRIES

(75) Inventors: Steven V. Luong, San Jose, CA (US); Heidi H. Ou, San Jose, CA (US); Rena W. Yang, Sunnyvale, CA (US); Xiang Zheng, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 732 days.

(21) Appl. No.: 10/821,354

(22) Filed: Apr. 8, 2004

(51) Int. Cl.
 *G01R 31/08* (2006.01)
(52) U.S. Cl. .................. 370/237; 370/351
(58) Field of Classification Search ............... None
 See application file for complete search history.

(56) References Cited

U.S. PATENT DOCUMENTS 5,265,092 A * 11/1993 Soloway et al. .......... 370/238
6,049,524 A *  4/2000 Fukushima et al. ....... 370/220

OTHER PUBLICATIONS

T. Li et al., Intermediate System to Intermediate System (IS-IS) Cryptographic Authentication, Jul. 2003, The Internet Society, pp. 1 and 3.*

ISO/IEC 10589 International Organization for Standardization, 1992 Copyright Office, Case Postale 56, CH-1211 Geneve 20, Switzerland.

Li, et al., "Intermediate System to Intermediate System (IS-IS) Cryptographic Authentication," Copyright The Internet Society (2003). RFC 3567. pp. 1-6.

* cited by examiner

*Primary Examiner*—Chau Nguyen
*Assistant Examiner*—Dargaye H Churnet
(74) *Attorney, Agent, or Firm*—Weaver Austin Villeneuve & Sampson LLP (57) ABSTRACT

Disclosed are methods and apparatus for handling Link State Packets (LSPs) sent between processing nodes within a computer network. At a first node, an LSP sent by a second node is received. The received LSP specifies connectivity information regarding the second node. It is then determined whether one of two conditions is met: either the received LSP is an updated LSP even though it appears older and a corresponding stored LSP fails authentication, or the received LSP fails authentication and it appears newer. If it is determined that one of these conditions is met, as well as purging criteria, then updating procedures are then performed on the LSP information that is maintained by the first node, where the LSP information was originally obtained from a corresponding LSP sent by the second node.

57 Claims, 7 Drawing Sheets

APPARATUS AND METHODS FOR UPDATING STALE LINK STATE PACKETS AND ROUTING TABLE ENTRIES

BACKGROUND OF THE INVENTION

The present invention relates to apparatus and methods for facilitating data routing in a computer network. More specifically, it relates to handling stale or invalid Link State Packets (LSP's), which are used in a Link State Type Protocol, such as the IS-IS protocol.

Figure 1:
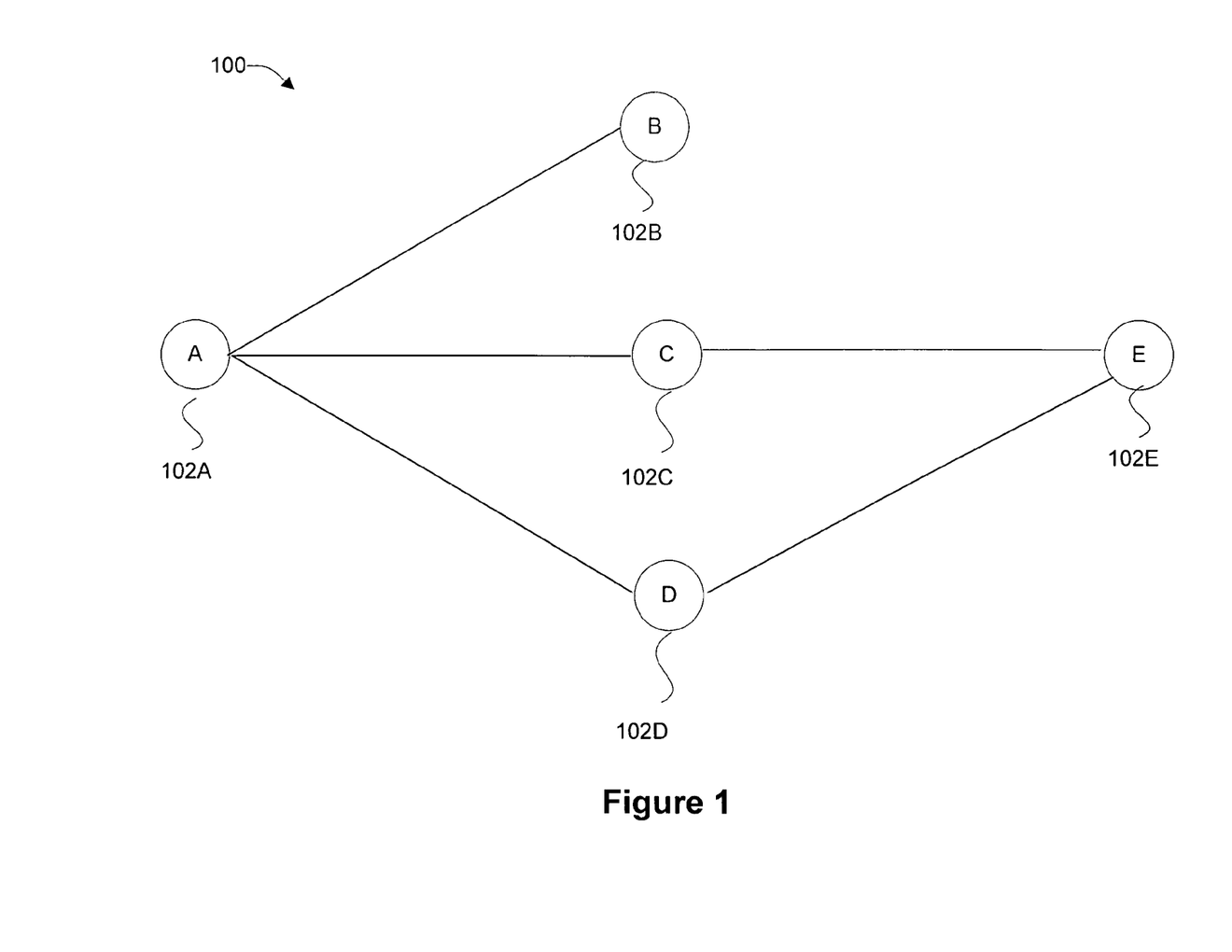
FIG. 1 is a diagrammatic representation of a plurality of nodes within a computer network.

In a network that uses the IS-IS protocol, each node generates a set of LSP's that describe its connectivity to its neighbors and floods these LSPs to its neighbors. This connectivity information specifies who is connected to whom and the cost associated with each connection, such as a value which is configured by an operator to correspond to a speed of a particular connection. Thus, each node receives connectivity information in the form of LSPs from its neighbors. The LSPs received at a particular node are then flooded by the particular node to its neighbors and, hence, propagated throughout the network. For example as shown in FIG. 1, a first Node A is connected to Nodes B, C, and D. Node A will send one or more LSPs to each of its neighbors B, C, and D, and the LSP(s) will specify that Node A is connected directly to Nodes B, C, and D. When Node C, who is connected to Node A and E, receives an LSP from Node A, Node C will then flood these LSP(s) to its neighbor Node E. Node C also sends its own LSPs specifying its particular connection information to its neighbor Node E and Node A. Each node in the network then uses its received LSPs to build a map of connectivity and determine possible routing paths (e.g., to form a routing table) based on the map of connectivity.

One concern in this type of protocol operation is reliability. It is important that each node acquires the most updated LSPs from its neighbor nodes. Towards this end, the IS-IS protocol utilizes built in sequence numbers to ensure that all nodes reliably acquire updated LSPs. When a particular node initially sends an LSP, the sent LSP includes a sequence number 1. Thereafter, when the particular node sends an updated LSP, the LSP will include an incremented sequence number. The process of determining which LSP is newer generally includes comparing the sequence number, remaining life time, and checksum of two LSP's. If the sequence number of one of the LSP's is higher, the LSP with the higher sequence number is newer. If the sequence numbers are the same, the LSP with zero remaining life time is considered newer. If both LSPs have zero remaining life time, the LSP with the higher checksum is considered newer.

The IS-IS Protocol also includes several security mechanisms. One security measure includes the use of a single password or key to authenticate each LSP. That is, each node in a particular network is configured to send its LSPs with a particular password and to authenticate received LSPs using the same particular password. Some implementations allow one to configure to send a password without checking the password for received packets, i.e., one-way authentication.

The use of a single key has several disadvantages. For instance, a person may leave a company and retain the password, as a result, compromising the security of the company's network. Another security approach includes multiple keys that are used sequentially for limited time periods. A first key is used during an initial time period and then replaced with a second key. The second key is then used for a second period of time until it too is replaced by a third key, etc.

Although the above type of Link State Protocol schemes work well under certain conditions, stale or invalid LSPs can be improperly handled by a receiving node and its neighbors' databases under other conditions. For instance, LSPs which contain updated connectivity information are sometimes not interpreted as being updated LSPs, and are instead discarded without updating the receiving nodes databases. In other situations, it may be desirable to isolate a node which is being attacked from the other nodes of a network. Effective mechanisms for isolating such an attacked node are currently unavailable.

Accordingly, improved mechanisms for updating and purging LSPs are needed. In particular, improved mechanisms for recognizing and handling updated LSPs, as well as improved mechanisms for purging stale and invalid LSPs, are needed.

SUMMARY OF THE INVENTION

Accordingly, the present invention provides methods and apparatus for handling stale or invalid Link State Packets (LSPs). In one general embodiment, an LSP is recognized as being an updated LSP even though it is considered to be older than a previously stored LSP. In another embodiment, an LSP sent by a sending node that fails authentication triggers purging of LSP databases at a neighbor node that receives the invalid LSP. The neighbor node is also configured to flood to its own neighbors with a corresponding LSP that is structured to cause the purging of connectivity information regarding the sending node. This causes the sending node to be isolated from the network.

In one embodiment, a method for handling Link State Packets (LSPs) sent between processing nodes within a computer network is disclosed. At a first node, an LSP sent by a second node is received. The received LSP specifies connectivity information regarding the second node. It is then determined whether the received LSP is an updated LSP even when the received LSP is considered to be older than another LSP previously sent by the second node to the first node. If it is determined that the received LSP is an updated LSP, updating procedures are then performed on LSP information that is maintained by the first node, where the LSP information was obtained from one or more LSPs sent by the second node.

In a preferred embodiment, the LSP information is updated only if one or more purging conditions are met that minimize security problems. In one aspect, the purging conditions include one or more of the following conditions: (i) authentication is configured in the first node, (ii) the second node is coupled directly to the first node, (iii) adjacency has been re-established between the first and second nodes, and (iv) the second node is receiving the LSP from a same interface as was used during the re-establishment of adjacency.

In a specific implementation, the received LSP is in a format which complies with a link state type routing protocol, such as the IS-IS Protocol. In another implementation, the determination of whether the received LSP is an updated LSP comprises determining that the received LSP is an updated LSP if (i) authentication succeeds for the received LSP, (ii) the LSP is considered to be older than another LSP previously stored for the second node, and (iii) the stored LSP fails authentication. In a further aspect, a second LSP is sent from the first node back to the second node if it is determined that the received LSP is an updated LSP. In yet a further aspect, the second LSP is formed by stripping the connectivity information from the previously stored LSP. In yet a further implementation, a third LSP sent from the second node in response to the second LSP is received at the first node, wherein the third LSP contains the updated sequence number. The performing of the updating procedures on the LSP information is then based on the received third LSP.

In a further implementation, the first node's routing tables are updated based on the LSP information maintained by the first node after the updating procedures based on the third LSP's information are performed. The received third LSP is also flooded from the first node to its neighbor nodes if present.

In an alternative method embodiment, at a first node, an LSP sent by a second node is received. The LSP specifies connectivity information regarding the second node. If the received LSP fails authentication and it is considered newer, LSP information regarding the second node that is being maintained by the first node is purged and a second LSP is flooded from the first node to the first node's neighbor nodes. The second LSP is configured to cause a purging of LSP information regarding the second node that is being maintained by the neighbor nodes.

In a specific implementation, the second LSP is formed by stripping the connectivity information from the first LSP. In one embodiment, the second node is being attacked. In another embodiment, the LSP information is purged and the second LSP is flooded to the first node's neighbor nodes only if the received LSP appears newer than a stored LSP that was last previously stored for the second node by the first node and one or more purging conditions are met that minimize an intruder from isolating the second node from the network.

In a specific aspect, the purging conditions include one or more of the following: (i) authentication is configured in the first node, (ii) the second node is coupled directly to the first node, (iii) adjacency has been re-established between the first and second nodes, and (iv) the second node is receiving the LSP from the same interface as was used during the re-establishment of adjacency.

In other embodiments, the invention pertains to an apparatus operable to handle LSPs sent between processing nodes within a computer network. The apparatus includes one or more processors and one or more memory. At least one of the memory and processors are adapted to provide at least some of the above described method operations.

In yet other embodiments, the invention pertains to a computer program product for handling LSPs sent between processing nodes within a computer network. The computer program product has at least one computer readable medium and computer program instructions stored within at least one of the computer readable product configured to perform at least some of the above described method operations.

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In a first scenario, when processing nodes in a computer network are configured to have multiple keys to authenticate an LSP, as the current key is about to expire, the new key as well as the old key are typically accepted to allow a smooth transition. During this transition period, each node is supposed to rebuild and refresh its own LSP with the new key, e.g., under the IS-IS Protocol. However, if one of the nodes crashes during this transition period and the transition period closes while the failed node is rebooting, the old key will become invalid and the new key will become the only valid key. In such a scenario, all of the non-failing nodes in the network have employed the new key, rebuilt their LSPs according to the new key, and flooded them to their neighbors. However, the node which had failed did not get a chance to generate and propagate LSPs with the new key to other nodes since it was in the midst of rebooting.

When the failed node is finally up and running, it will build its LSPs with the new key and try to flood them to the other nodes. However, the LSPs generated prior to the reboot by the failed node may be considered newer because they may have a greater sequence number than the newly built LSPs since the rebooted node will reinitialize its sequence number back to 1 after reboot. Higher sequence numbers typically imply a newer LSP and the newest LSP is usually the copy that every node uses and propagates. In one implementation, a node that receives a lower sequence numbered LSP would try to flood an LSP with a higher sequence number stored for the failed node back to this failed node. Since the failed node's previously stored LSP would now carry an expired key, the failed node will fail to validate its own previous LSP and reject it. This rejection will prevent the failed node from triggering to regenerate new LSPs with a higher sequence number. Thus, the nodes in the network will continue to use the failed node's previous LSPs, which may produce incorrect routes until the old LSP expires. This expiration may occur several hours after the reboot of the failed node.

In another scenario, each node is configured with one key to authenticate LSP. If a network operator discovers that a particular node is being constantly attacked, one response would be to isolate the node being attacked by configuring a different key on it. Once the node is configured with a different key than the rest of the other nodes in the network, the operator hopes that its LSP will be rejected by its neighbors so that the attacked node is then isolated from the rest of the network. Unfortunately, its neighbors will continue to use the attacked node's old LSPs until they expire, which could take hours. During that period of time, traffic is still forwarded to the node under attack even though alternative path may exists in the network. The administrator could do more to isolate the attacked node, e.g. shutting down all IS-IS interfaces of the attacked node. But if the attacked node has many interfaces or some of these interfaces are also running other routing protocols, which are not affected by the secret key change, this approach will disrupt the network unnecessarily.

Another software approach is to let the attacked node purge its old LSPs before employing the newly configured key, but it is impossible to determine when all the IS-IS speakers in the network has purged its old LSPs, especially in broadcast media which does not include any explicit acknowledgements upon receiving the LSP.

Another method to update stale LSPs is to go around to each IS-IS speaker and clear these LSPs from their LSP database, but unless the network operator can invoke this LSP flushing in all IS-IS speakers simultaneously, any node that has not yet received the flushing command will flood stale LSPs back to any node that has just executed the flush. The conventional method of clearing stale LSPs fails and cannot be used in this case.

In general terms, embodiments of the present invention provide efficient and reliable mechanisms for handling the above two scenarios. When a network of nodes are configured with multiple keys, in one embodiment each node is operable to determine whether a received LSP is an updated LSP even if it is considered to be older than a previously sent LSP. When the received LSP is determined to be an updated LSP, the receiving node then performs appropriate updating procedures, such as purging, based on the updated LSP. In another embodiment, each node is also or alternatively configured to isolate a node that is being attacked. In this embodiment, the attacked node sends an LSP having an invalid key and the LSP is considered to be newer than a previously stored LSP to thereby trigger a purging of its LSPs from the receiving node and its neighbors' databases. In any of these embodiments, purging operations are only performed when certain strict conditions are met so as to minimize security breaches.

The procedures described herein are especially applicable to the IS-IS protocol. Hence, the following embodiments are described with reference to the IS-IS protocol. The IS-IS Protocol is described in the publication entitled "Information Technology—Telecommunications and Information Exchange between Systems—Intermediate System to Intermediate System Intra-domain Routing Information Exchange Protocol for Use in Conjunction with the Protocol for Providing the Connectionless Mode Network Service (ISO 8473)", published by the International Organization of Standardization, ISO/IEC 10589 (1992), which publication is incorporated herein by reference in its entirety. However, the description of the present invention in terms of the IS-IS Protocol is not meant to the limit the scope of the invention. That is, the techniques of the present invention may be applied to any suitable type of Link State Protocol.

Figure 2A:
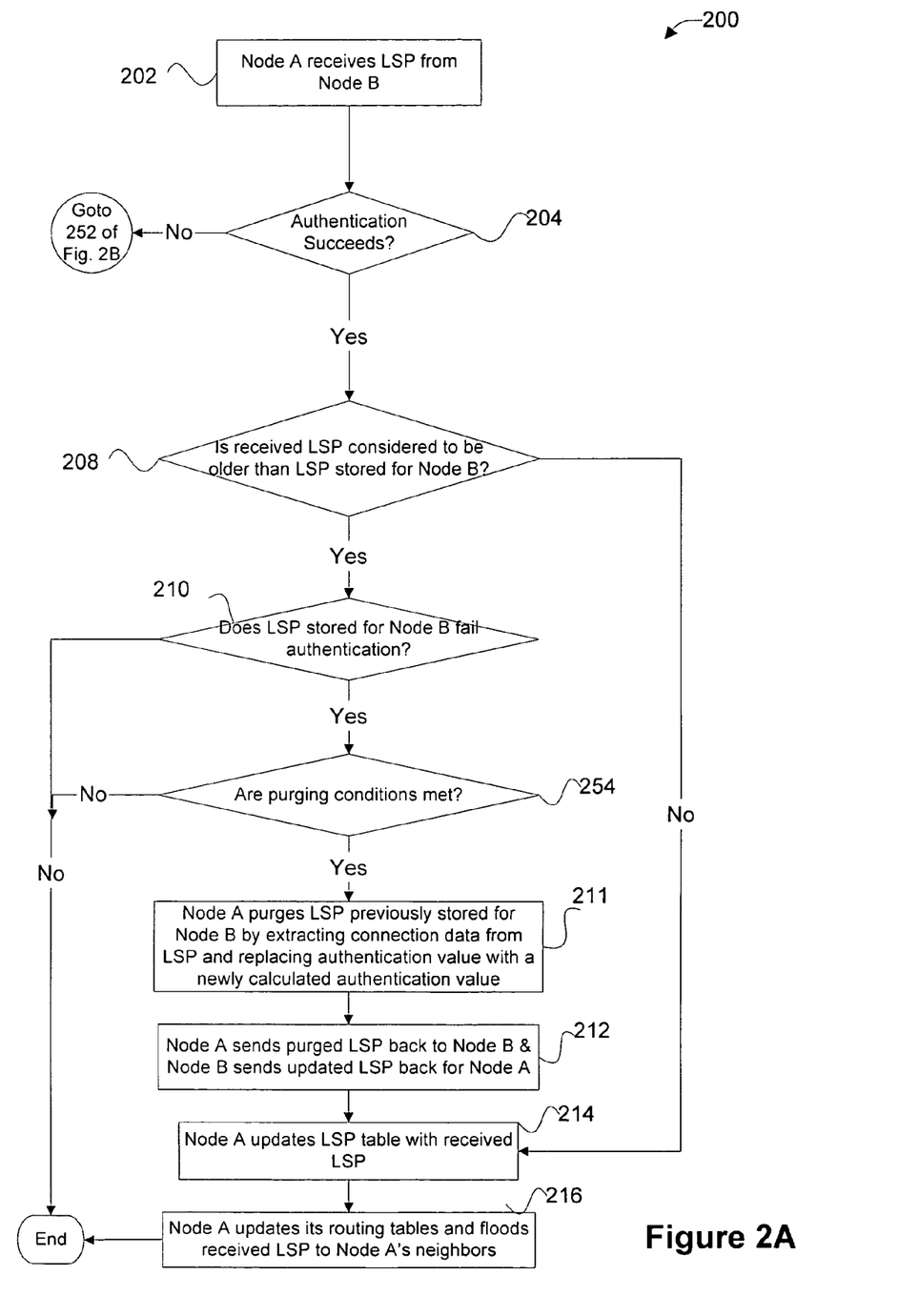
FIGS. 2A through 2B include a flowchart illustrating a procedure for handling stale or invalid Link State Packets (LSP's) in accordance with one embodiment of the present invention.
Figure 2B:
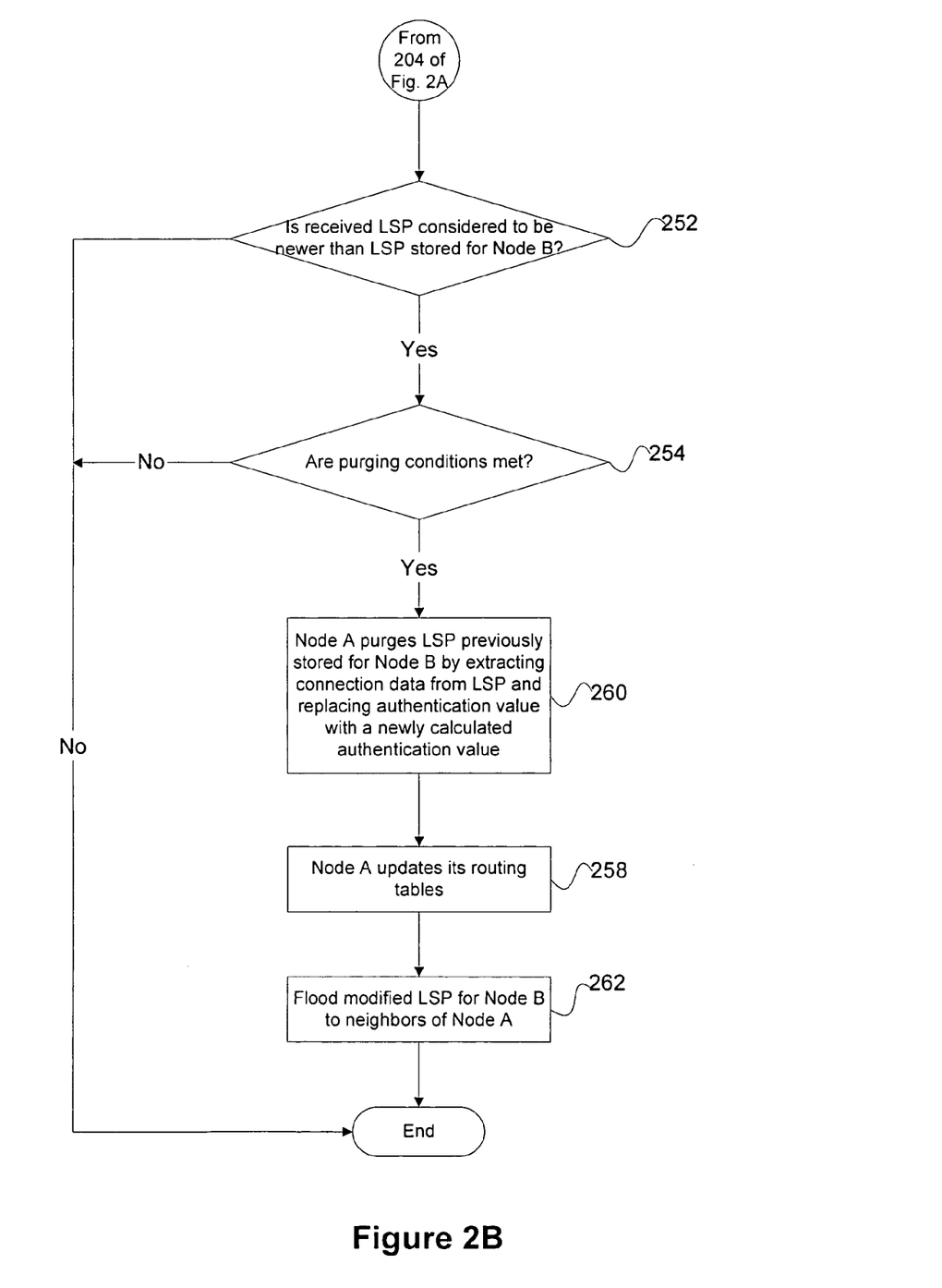

FIGS. 2A through 2B include a flowchart illustrating a procedure 200 for handling stale or invalid LSP in accordance with one embodiment of the present invention. Initially, Node A receives an LSP from Node B in operation 202. In nodes which are configured with authentication, it is then determined whether authentication succeeds in operation 204. Authentication may be determined in any suitable manner. In one implementation, the LSP contains a signature which was generated based on a key. The signature is then compared to the signature computed from a preconfigured password. A match indicates that authentication is successful, while a mismatch indicates that the authentication was not successful.

If authentication succeeds, it is then determined whether the received LSP is considered to be older than the LSP previously stored for Node B in operation 208. An LSP may be considered to be older (or newer) than another LSP under various conditions which are dependent on the particular protocol. The process of determining which LSP is considered older generally includes comparing the sequence number, remaining life time, and checksum of a received LSP and a previously stored LSP. If the sequence number of one of the LSP's is lower, the LSP with the lower sequence number is older. If the sequence numbers are the same, the LSP with zero remaining life time is considered newer, while the other is considered older. If both LSPs have zero remaining life time, the LSP with the lower checksum is considered older, and visa versa.

If the received LSP is considered to be older, Node A does not merely assume that the received LSP is outdated but goes on to then determine whether the LSP stored for node B fails authentication in operation 210. If the stored LSP fails authentication, it may then be determined whether one or more purging conditions are met in operation 254. If the conditions are met, Node A then purges the LSP stored for Node B by extracting connection data from the stored LSP and replacing the authentication value of the stored LSP with a newly calculated authentication value in operation 211. Node A then sends the purged LSP back to Node B and Node B in response sends an updated LSP back to Node A with an updated sequence number in operation 212. Since the purged LSP that is sent back to Node B is preferably formed by modifying an LSP previously stored for Node B, the purged LSP has a higher sequence number than the LSP previously sent by Node B to Node A. Node B can then use a more updated sequence number. Several purging condition embodiments are further described below with respect to FIG. 4.

Figure 3A:
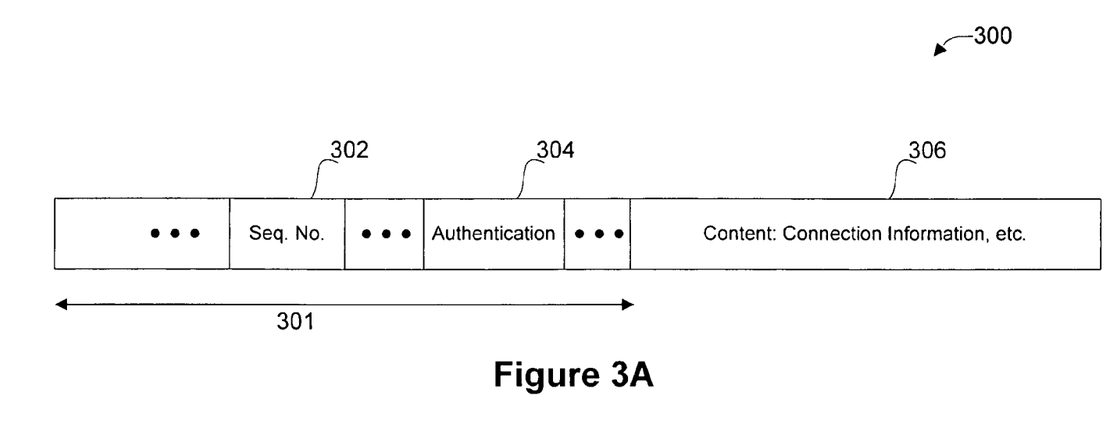
FIG. 3A is a diagrammatic representation of an LSP sent from a first node to a second node in accordance with one embodiment of the present invention.
Figure 3B:
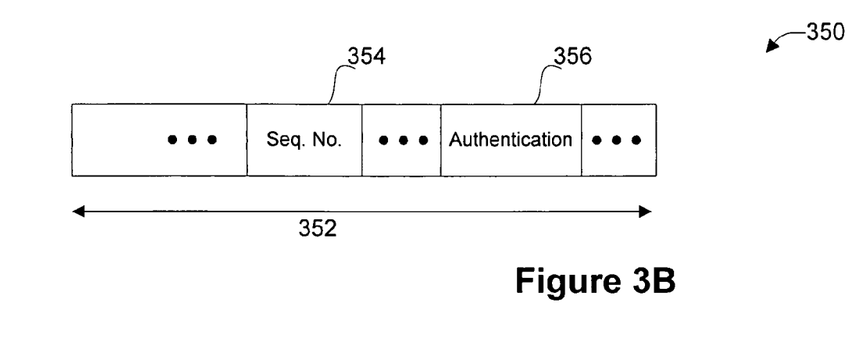
FIG. 3B is a diagrammatic representation of an LSP from which its content is stripped in accordance with one embodiment of the present invention.

For instance as shown in FIG. 3A, Node B initially sends LSP 300 having a sequence number field 302, an authentication field 304, and connection information 306. Since Node B has just rebooted, the sequence number may equal 1 in one implementation. In one embodiment, Node A then strips off the content 306, which includes the connectivity information, of a previously stored LSP and replaces the authentication value with an newly computed value to form a modified LSP 350 as shown in FIG. 3B. This modified LSP 350 contains the sequence number 354 for an LSP stored prior to the re-boot of Node B.

Of course, the described implementation is specific to the IS-IS Protocol and may be modified to conform to any suitable Link State type protocol. For example, the content of the return LSP sent by Node A back to Node B does not necessarily have its content stripped away. Alternatively, Node A may be configured to simply update its LSP tables using the received LSP and its lower sequence number without communicating the higher previously received sequence number back to Node B. However, this alternative embodiment has inherent security risks.

Referring back to the illustrated embodiment, after an updated LSP with a new sequence number is received from Node B, Node A then updates its LSP table by replacing the LSPs previously stored for Node B with the newly received LSP in operation 214. The Node A then updates its routing tables based on the updated LSP tables and floods the new updated LSP for Node B to Node A's neighbors in operation 216.

In one implementation, one or more LSP tables may be used to store connectivity information received from each node. A connectivity map may then be generated by Node A based on its LSP tables. An already existing map may simply be updated based on a change to the LSP tables. The map is then used to generate routing tables. For example, each node computes the shortest distance between itself and each of the other nodes in the network to thereby form a routing table. The routing table of a node may then be used by such node to efficiently route incoming packets towards their destination.

After purging and/or updating operations are performed, the procedure then ends until a next LSP is received from Node B into Node A. If the LSP stored for Node B did not fail authentication or purging conditions are not met, the procedure 200 would also end without performing operations 212 through 216. Of course, the procedure of FIGS. 2A and 2B is also applicable for LSPs received from other nodes in addition to Node B.

Accordingly, updated LSPs are recognized even when a node crashes during a transition period for changing the password and then reboots after the expiration of such transition period. Although the rebooted node sends an updated LSP with a new signature based on a new password and the LSP is considered to be older than a previously sent LSP, the receiving node will recognize that the received LSP as an updated LSP which is then used to replace an older LSP in the receiving node's (as well as the receiving node's neighbors') databases. In the present implementation, the receiving node also notifies the sending node of the higher sequence number so that subsequently sent LSPs will no longer have a lower sequence number than LSPs stored for such sending node.

When authentication fails for the LSP (operation 204), the technique 200 proceeds to operation 252 of FIG. 2B. In operation 252 of FIG. 2B, it is determined whether the received LSP is considered newer than the LSP stored for Node B. This step is used to determine whether the currently received LSP supercedes the previously received LSPs for the same node. If the LSP is considered newer, it is then determined whether particular purging conditions are met in operation 254. These purging conditions are preferable so as to minimize security problems. Example purging conditions are explained further below with respect to FIG. 4.

If the purging conditions are met, Node A purges the LSP stored for Node B by stripping the contents and connection data from the received LSP and replacing the authentication value of the stored LSP with a newly calculated authentication value to form a modified LSP for Node B in operation 260 (e.g., LSP 350 of FIG. 3B). Node A then updates its routing tables based on the modified LSP in operation 258. The modified LSP for Node B is then flooded to the neighbors of Node A in operation 262. Since the modified LSP has no connection information, all of the receiving nodes purge connectivity information for Node B from their databases (e.g., LSP and routing tables).

If the LSP received from Node B into Node A is not considered to be newer than the LSP previously stored for Node B or the purging conditions are not met, operations 256 through 262 are skipped and the procedure 200 ends.

Figure 4:
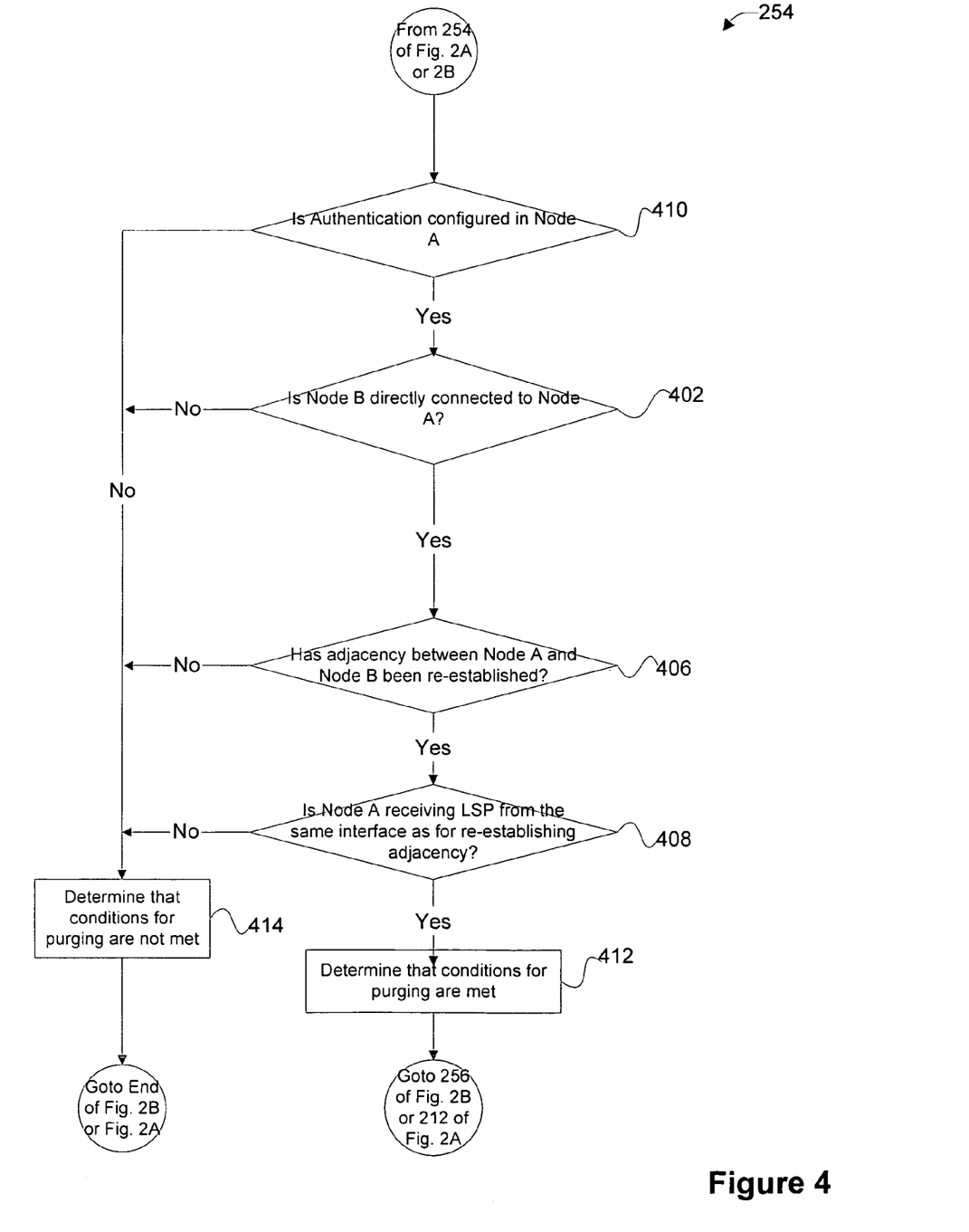
FIG. 4 is a flowchart illustrating the operation of FIG. 2A or 2B for determining whether purging conditions are met in accordance with one implementation of the present invention.

FIG. 4 is a flowchart illustrating the operation 254 of FIG. 2A or 2B for determining whether purging conditions are met in accordance with one implementation of the present invention. One or more of these conditions may be assessed to determine whether a purge is to be performed for a particular received LSP. Initially, it is determined whether authentication is configured in Node A in operation 410. In other words, purging is not performed if the node is not configured for authentication. As shown, if node is not configured for authentication, it is determined that the conditions for purging are not met in operation 414. The procedure then goes to the end of the procedure 200 of FIG. 2B.

Figure 5:
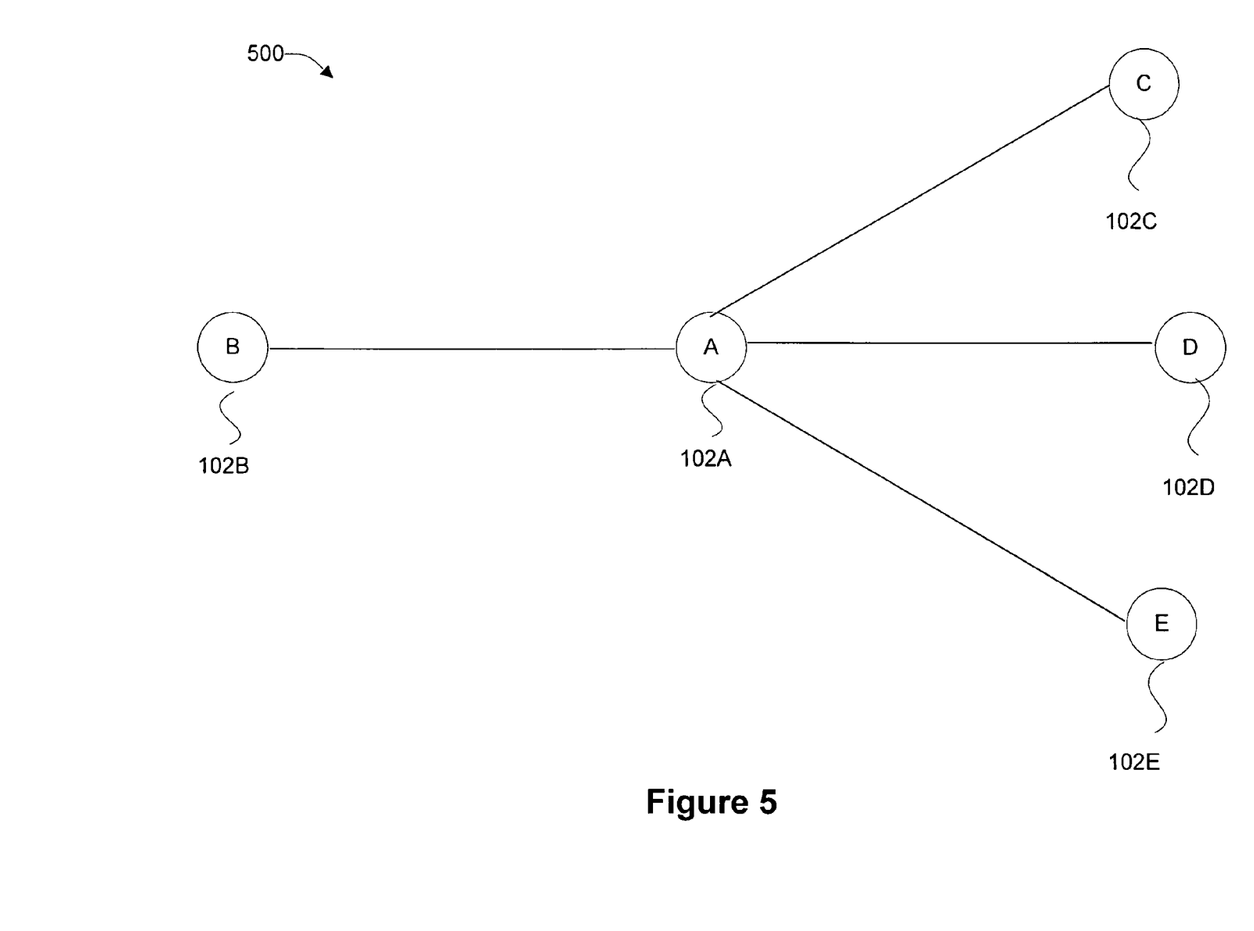
FIG. 5 illustrates a plurality of interconnected nodes in accordance with one embodiment of the present invention.

However, if authentication is configured in Node A, it is then determined whether Node B is connected directly to Node A in operation 402. FIG. 5 illustrates a plurality of interconnected nodes in accordance with one embodiment of the present invention. For example, Node D will only purge an invalid (i.e., failed authentication) LSP received from Node A but not from Node B because only Node A is connected directly to Node D while Node B is not.

Returning to the illustrated example where Node B is sending an updated LSP to Node A, if Node B is directly connected to Node A, it is then determined whether adjacency between Node A and Node B has been re-established in operation 406. An adjacency establishment procedure may include an exchange of data between Node A and Node B to determine information regarding each other. If adjacency is re-established with the sending Node B (e.g., by completion of the adjacency handshaking), it is then determined whether the Node A is receiving the LSP from the same interface as was used during the re-establishment of adjacency in operation 408. If Node A is receiving the LSP on the same interface, it is then determined that conditions for purging are met in operation 412. The procedure then goes to the operation 256 of FIG. 2B. If Node B is not directly connected to Node A or adjacency is not re-established or Node A is not receiving the LSP from the same interface as used for the re-establishment of adjacency, it is determined that conditions for purging are not met in operation 414. The procedure then goes to the end step of FIG. 2B. Both the re-establishment of adjacency and same interface determinations may be used to prevent hackers from maliciously isolating a particular node.

Generally, the techniques for handling LSPs of the present invention may be implemented on software and/or hardware. For example, it can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the LSP handling systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the LSP handling system may be implemented on a general-purpose network host machine such as a personal computer or workstation. Further, the invention may be at least partially implemented on a card (e.g., an interface card) for a network device or a general-purpose computing device.

Figure 6:
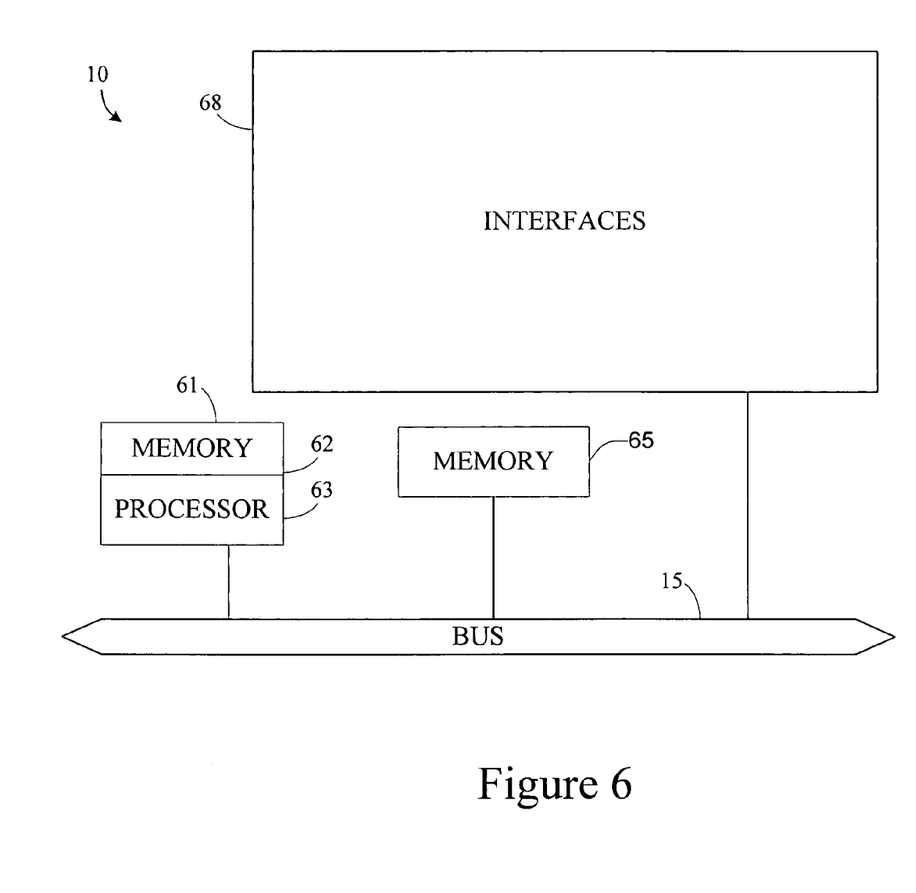
FIG. 6 is a diagrammatic representation of a router in which embodiments of the present invention may be implemented.

Referring now to FIG. 6, a router 10 suitable for implementing the present invention includes a master central processing unit (CPU) 62, interfaces 68, and a bus 15 (e.g., a PCI bus). When acting under the control of appropriate software or firmware, the CPU 62 is responsible for such router tasks as routing table computations and network management. It may also be responsible for analyzing received LSPs, updating or purging LSP tables, forming connectivity maps based on LSP tables, updating routing tables based on such maps, flooding LSPs to neighbor nodes or routers, etc. It preferably accomplishes all these functions under the control of software including an operating system (e.g., the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets or data segments over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 6 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 65) configured to store data, program instructions for the general-purpose network operations and/or the inventive techniques described herein. The program instructions may control the operation of an operating system and/or one or more applications, for example. The memory or memories may also be configured to store LSP tables, connectivity maps, routing tables, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A method for handling Link State Packets (LSPs) sent between processing nodes within a computer network, the method comprising:
   at a first node, receiving a first LSP sent by a second node, wherein the LSP specifies connectivity information regarding the second node;
   determining whether the first received LSP is an updated LSP even when the first received LSP is considered older than another LSP previously sent by the second node to the first node;
   if it is determined that the first received LSP is an updated LSP, performing updating procedures on LSP information, that is maintained by the first node, based on the first received LSP, wherein the LSP information was obtained from one or more LSPs sent by the second node, and
   updating the first node's routing tables based on the LSP information maintained by the first node after the updating procedures on the LSP information are performed,
   wherein the determination of whether the received LSP is an updated LSP comprises determining that the received LSP is an updated LSP if (i) authentication succeeds for the received LSP, (ii) the LSP is considered older than another LSP previously stored for the second node, and (iii) the stored LSP fails authentication.

2. A method as recited in claim 1, wherein the received LSP is in a format which complies with a link state type routing protocol and the LSP is considered older than another LSP based on one or more rules of the link state type routing protocol.

3. A method as recited in claim 2, wherein the received LSP is in a format which complies with the Intermediate System to Intermediate System (IS-IS) Protocol and the LSP is considered older than another LSP based on one or more rules of the IS-IS protocol.

4. A method as recited in claim 1, further comprising sending a second LSP from the first node back to the second node if it is determined that the received LSP is an updated LSP.

5. A method as recited in claim 4, further comprising forming the second LSP by stripping the connectivity information from the received LSP and replacing the authentication with a new authentication.

6. A method as recited in claim 5, further comprising receiving at the first node a third LSP sent from the second node in response to the second LSP, wherein the third LSP contains the updated sequence number, wherein performing the updating procedures on the LSP information is indirectly based on the first received LSP by being based on the third received LSP.

7. A method as recited in claim 6, further comprising flooding the received third LSP from the first node to its neighbor nodes if present.

8. A method as recited in claim 1, wherein the LSP information is updated only if one or more purging conditions are met that minimize security problems.

9. A method as recited in claim 8, wherein the one or more purging conditions comprise (i) authentication is configured in the first node, (ii) the second node is coupled directly to the first node, (iii) adjacency has been re-established between the first and second nodes, and (iv) the second node is receiving the LSP from a same interface as was used during the re-establishment of adjacency.

10. A first apparatus operable to handle Link State Packets (LSPs) sent between processing nodes within a computer network, the apparatus comprising:
one or more processors;
one or more memory, wherein at least one of the processors and memory are adapted for:
at the first apparatus, receiving a first LSP sent by a second apparatus, wherein the LSP specifies connectivity information regarding the second apparatus;
determining whether the first received LSP is an updated LSP even when the first received LSP is considered older than another LSP previously sent by the second apparatus to the first apparatus; and
if it is determined that the first received LSP is an updated LSP, performing updating procedures on LSP information that is maintained by the first node, based on the first received LSP, wherein the LSP information was obtained from one or more LSPs sent by the second node, and
updating the first node's routing tables based on the LSP information maintained by the first node after the updating procedures on the LSP information are performed,
wherein the determination of whether the received LSP is an updated LSP comprises determining that the received LSP is an updated LSP if (i) authentication succeeds for the received LSP, (ii) the LSP is considered older than another LSP previously stored for the second node, and (iii) the stored LSP fails authentication.

11. A first apparatus as recited in claim 10, wherein the received LSP is in a format which complies with a link state type routing protocol and the LSP is considered older than another LSP based on one or more rules of the link state type routing protocol.

12. A first apparatus as recited in claim 11, wherein the received LSP is in a format which complies with the Intermediate System to Intermediate System (IS-IS) Protocol and the LSP is considered older than another LSP based on one or more rules of the IS-IS protocol.

13. The first apparatus as recited in claim 10, wherein at least one of the processors and memory are further adapted for sending a second LSP with an updated sequence number from the first apparatus back to the second apparatus if it is determined that the received LSP is an updated LSP.

14. The first apparatus as recited in claim 13, wherein at least one of the processors and memory are further adapted for forming the second LSP by stripping the connectivity information from the received LSP and replacing the authentication with a newly computed authentication.

15. The first apparatus as recited in claim 14, wherein at least one of the processors and memory are further adapted for receiving at the first node a third LSP sent from the second node in response to the second LSP, wherein the third LSP contains the updated sequence number, wherein performing the updating procedures on the LSP information is indirectly based on the first received LSP by being based on the third received LSP.

16. The first apparatus as recited in claim 15, wherein at least one of the processors and memory are further adapted for flooding the received third LSP from the first apparatus to its neighbor nodes if present.

17. At least one computer readable storage medium having computer program instructions stored thereon that are arranged to perform the following operations:
at a first node, receiving a first LSP sent by a second node, wherein the LSP specifies connectivity information regarding the second node;
determining whether the first received LSP is an updated LSP even when the first received LSP is considered older than another LSP previously sent by the second node to the first node; and
if it is determined that the first received LSP is an updated LSP, performing updating procedures on LSP information, that is maintained by the first node, based on the first received LSP, wherein the LSP information was obtained from one or more LSPs sent by the second node, and
updating the first node's routing tables based on the LSP information maintained by the first node after the updating procedures on the LSP information are performed,
wherein the determination of whether the received LSP is an updated LSP comprises determining that the received LSP is an updated LSP if (i) authentication succeeds for the received LSP, (ii) the LSP is considered older than another LSP previously stored for the second node, and (iii) the stored LSP fails authentication.

18. At least one computer readable storage medium as recited in claim 17, wherein the received LSP is in a format which complies with a link state type routing protocol and the LSP is considered older than another LSP based on one or more rules of the link state type routing protocol.

19. At least one computer readable storage medium as recited in claim 18, wherein the received LSP is in a format which complies with the Intermediate System to Intermediate System (IS-IS) Protocol and the LSP is considered older than another LSP based on one or more rules of the IS-IS protocol.

20. At least one computer readable storage medium as recited in claim 17, wherein the computer program instructions are further configured for sending a second LSP with an updated sequence number from the first node back to the second node if it is determined that the received LSP is an updated LSP.

21. At least one computer readable storage medium as recited in claim 20, wherein the computer program instructions are further configured for forming the second LSP by stripping the connectivity information from the received LSP and replacing the authentication value of the received LSP with a newly computed authentication value.

22. At least one computer readable storage medium as recited in claim 21, wherein the computer program instructions are further configured for receiving at the first node a third LSP sent from the second node in response to the second LSP, wherein the third LSP contains the updated sequence number, wherein performing the updating procedures on the LSP information is indirectly based on the first received LSP by being based on the third received LSP.

23. At least one computer readable storage medium as recited in claim 22, wherein the computer program instructions are further configured for flooding the received third LSP from the first node to its neighbor nodes if present.

24. At least one computer readable storage medium as recited in claim 17, wherein the LSP information is updated only if one or more purging conditions are met that minimize security problems.

25. At least one computer readable storage medium as recited in claim 24, wherein the one or more purging conditions comprise (i) authentication is configured in the first node, (ii) the second node is coupled directly to the first node, (iii) adjacency has been re-established between the first and second nodes, and (iv) the second node is receiving the LSP from a same interface as was used during the re-establishment of adjacency.

26. A first apparatus for handling Link State Packets (LSPs) sent between processing nodes within a computer network, comprising:
    means for at the first apparatus, receiving a first LSP sent by a second apparatus, wherein the LSP specifies connectivity information regarding the second apparatus;
    means for determining whether the first received LSP is an updated LSP even when the first received LSP has a lower sequence number than another LSP previously sent by the second apparatus to the first apparatus; and
    means for if it is determined that the first received LSP is an updated LSP, performing updating procedures on LSP information, that is maintained by the first node, based on the first received LSP, wherein the LSP information was obtained from one or more LSPs sent by the second node,
    updating the first node's routing tables based on the LSP information maintained by the first node after the updating procedures on the LSP information are performed; and
    means for sending a second LSP with an updated sequence number from the first apparatus back to the second apparatus if it is determined that the received LSP is an updated LSP.

27. The first apparatus as recited in claim 26, further comprising means for forming the second LSP by stripping the connectivity information from the received LSP and replacing the sequence number of the received LSP with the updated sequence number.

28. The first apparatus as recited in claim 27, further comprising means for receiving at the first node a third LSP sent from the second node in response to the second LSP, wherein the third LSP contains the updated sequence number, wherein performing the updating procedures on the LSP information is indirectly based on the first received LSP by being based on the third received LSP.

29. The first apparatus as recited in claim 28, further comprising means for flooding the received third LSP from the first node to its neighbor nodes if present.

30. A method for handling Link State Packets (LSPs) sent between processing nodes within a computer network, the method comprising:
    at a first node, receiving an LSP sent by a second node, wherein the LSP specifies connectivity information regarding the second node;
    if the received LSP fails authentication and the received LSP is considered newer than a stored LSP that was last previously stored for the second node by the first node, purging LSP information regarding the second node that is being maintained by the first node; and
    if the received LSP fails authentication and the received LSP is considered newer than a stored LSP that was last previously stored for the second node by the first node, flooding a second LSP from the first node to the first node's neighbor nodes, wherein the second LSP is structured to cause a purging of LSP information regarding the second node that is being maintained by the neighbor nodes,
    wherein the LSP information is purged and the second LSP is flooded to the first node neighbor nodes only if one or more purging conditions are met that minimize an intruder from isolating the second node from the network.

31. A method as recited in claim 30, further comprising forming the second LSP by stripping the connectivity information from the first LSP.

32. A method as recited in claim 30, wherein the second node is being attacked.

33. A method as recited in claim 30, wherein the received LSP is in a format which complies with a link state type routing protocol.

34. A method as recited in claim 33, wherein the received LSP is in a format which complies with the Intermediate System to Intermediate System (IS-IS) Protocol.

35. A method as recited in claim 30, wherein the purging conditions comprise (i) authentication is configured in the first node, (ii) the second node is coupled directly to the first node, (iii) adjacency has been re-established between the first and second nodes, and (iv) the second node is receiving the LSP from a same interface as was used during the re-establishment of adjacency.

36. A method as recited in claim 30, further comprising updating the first node's routing tables based on the LSP information maintained by the first node after the LSP information regarding the second node has been purged.

37. A method as recited in claim 35, further comprising forming the second LSP by stripping the connectivity information from the received LSP.

38. A first apparatus operable to handle Link State Packets (LSPs) sent between processing nodes within a computer network, the apparatus comprising:
    one or more processors;
    one or more memory, wherein at least one of the processors and memory are adapted for:
        at the first apparatus, receiving an LSP sent by a second apparatus, wherein the LSP specifies connectivity information regarding the second apparatus;
        if the received LSP fails authentication and the received LSP is considered newer than a stored LSP that was last previously stored for the second node by the first node, purging LSP information regarding the second apparatus that is being maintained by the first apparatus; and
        if the received LSP fails authentication and the received LSP is considered newer than a stored LSP that was last previously stored for the second node by the first node, flooding a second LSP from the first apparatus to the first apparatus' neighbor apparatus, wherein the second LSP is structured to cause a purging of LSP information regarding the second apparatus that is being maintained by the neighbor apparatus,
        wherein the LSP information is purged and the second LSP is flooded to the first node neighbor nodes only if one or more purging conditions are met that minimize an intruder from isolating the second node from the network.

39. The first apparatus as recited in claim 38, wherein the at least one of the processors and memory are further adapted for forming the second LSP by stripping the connectivity information from the first LSP.

40. The first apparatus as recited in claim 38, wherein the second apparatus is being attacked.

41. The first apparatus as recited in claim 38, wherein the received LSP is in a format which complies with a link state type routing protocol.

42. The first apparatus as recited in claim 41, wherein the received LSP is in a format which complies with the Intermediate System to Intermediate System (IS-IS) Protocol.

43. The first apparatus as recited in claim 38, wherein the purging conditions comprise (i) authentication is configured in the first apparatus, (ii) the second apparatus is coupled directly to the first apparatus, (iii) adjacency has been re-established between the first and second apparatus, and (iv) the second apparatus is receiving the LSP from a same interface as was used during the re-establishment of adjacency.

44. The first apparatus as recited in claim 38, wherein the at least one of the processors and memory are further adapted for updating the first apparatus' routing tables based on the LSP information maintained by the first apparatus after the LSP information regarding the second apparatus has been purged.

45. The first apparatus as recited in claim 43, wherein the at least one of the processors and memory are further adapted for forming the second LSP by stripping the connectivity information from the received LSP.

46. At least one computer readable storage medium having computer program instructions stored thereon that are arranged to perform the following operations:
   at a first node, receiving an LSP sent by a second node, wherein the LSP specifies connectivity information regarding the second node;
   if the received LSP fails authentication and the received LSP is considered newer than a stored LSP that was last previously stored for the second node by the first node, purging LSP information regarding the second node that is being maintained by the first node; and
   if the received LSP fails authentication and the received LSP is considered newer than a stored LSP that was last previously stored for the second node by the first node, flooding a second LSP from the first node to the first node's neighbor nodes, wherein the second LSP is structured to cause a purging of LSP information regarding the second node that is being maintained by the neighbor nodes,
   wherein the LSP information is purged and the second LSP is flooded to the first node neighbor nodes only if one or more purging conditions are met that minimize an intruder from isolating the second node from the network.

47. At least one computer readable storage medium as recited in claim 46, wherein the computer program instructions are further configured for forming the second LSP by stripping the connectivity information from the first LSP.

48. At least one computer readable storage medium as recited in claim 46, wherein the second node is being attacked.

49. At least one computer readable storage medium as recited in claim 46, wherein the received LSP is in a format which complies with a link state type routing protocol.

50. At least one computer readable storage medium as recited in claim 49, wherein the received LSP is in a format which complies with the Intermediate System to Intermediate System (IS-IS) Protocol.

51. At least one computer readable storage medium as recited in claim 46, wherein the purging conditions comprise (i) authentication is configured in the first node, (ii) the second node is coupled directly to the first node, (iii) adjacency has been re-established between the first and second nodes, and (iv) the second node is receiving the LSP from a same interface as was used during the re-establishment of adjacency.

52. At least one computer readable storage medium as recited in claim 46, wherein the computer program instructions are further configured for updating the first node's routing tables based on the LSP information maintained by the first node after the LSP information regarding the second node has been purged.

53. At least one computer readable storage medium as recited in claim 51, wherein the computer program instructions are further configured for forming the second LSP by stripping the connectivity information from the received LSP.

54. A first apparatus operable to handle Link State Packets (LSPs) sent between processing nodes within a computer network, the first apparatus comprising:
   at the first apparatus, means for receiving an LSP sent by a second apparatus, wherein the LSP specifies connectivity information regarding the second apparatus;
   means for purging LSP information regarding the second apparatus that is being maintained by the first apparatus if the received LSP fails authentication and the received LSP is considered newer than a stored LSP that was last previously stored for the second node by the first node; and
   means for flooding a second LSP from the first apparatus to the first apparatus' neighbor apparatus if the received LSP fails authentication and the received LSP is considered newer than a stored LSP that was last previously stored for the second node by the first node, wherein the second LSP is structured to cause a purging of LSP information regarding the second apparatus that is being maintained by the neighbor apparatus,
   wherein the LSP information is purged and the second LSP is flooded to the first node neighbor nodes only if one or more purging conditions are met that minimize an intruder from isolating the second node from the network.

55. The first apparatus as recited in claim 54, wherein the purging conditions comprise (i) authentication is configured in the first apparatus, (ii) the second apparatus is coupled directly to the first apparatus, (iii) adjacency has been re-established between the first and second apparatus, and (iv) the second apparatus is receiving the LSP from a same interface as was used during the re-establishment of adjacency.

56. The first apparatus as recited in claim 54, further comprising means for updating the first apparatus' routing tables based on the LSP information maintained by the first apparatus after the LSP information regarding the second apparatus has been purged.

57. The first apparatus as recited in claim 55, further comprising means for forming the second LSP by stripping the connectivity information from the received LSP.

* * * * *